March 27, 1934. W. M. KONIKOV 1,952,441
EMERGENCY BRAKE ALARM FOR MOTOR VEHICLES
Filed April 28, 1933
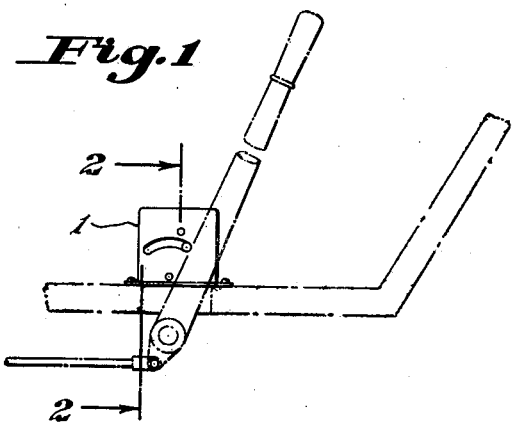
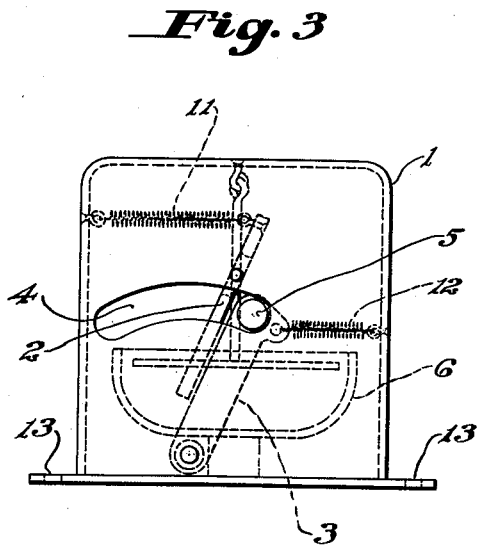
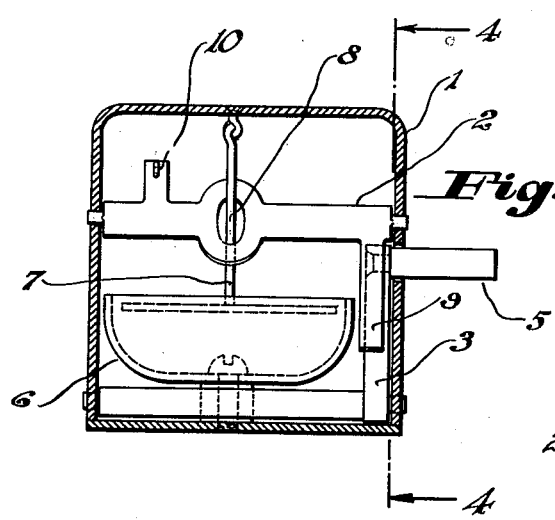
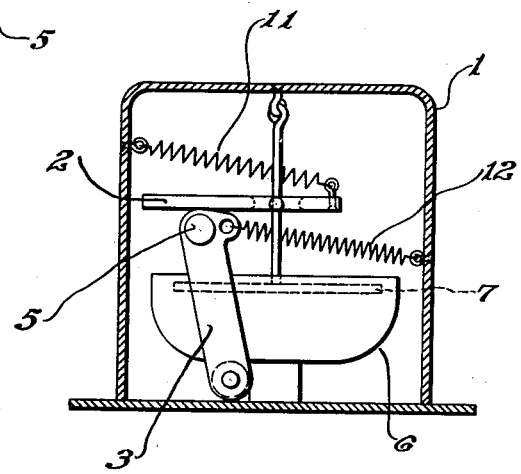
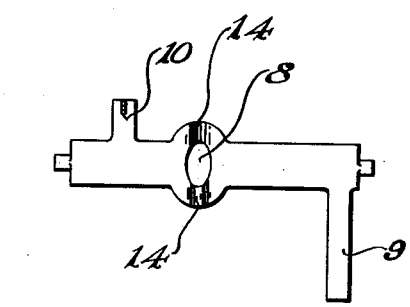
Inventor
William M. Konikov
Charles E. Ruby,
Attorney Patented Mar. 27, 1934

1,952,441

UNITED STATES PATENT OFFICE 1,952,441

EMERGENCY BRAKE ALARM FOR MOTOR VEHICLES

William M. Konikov, Boston, Mass.

Application April 28, 1933, Serial No. 668,326

11 Claims. (Cl. 116—56)

The present invention relates generally to signalling devices, particularly to signalling devices actuated by jolting of the objects upon which they are positioned, and more particularly to that class of signalling devices employed for indicating, under certain conditions of operation, the necessity of releasing mechanisms in engagement: it is herein shown embodied in an emergency brake alarm for motor vehicles.

In the operation of motor vehicles, it is the common practice, for the purposes of safe parking, to apply the emergency brakes after bringing the motor vehicles to a standstill. It is also unfortunately the not uncommon practice for the operators of motor vehicles inadvertently to start off their cars and to drive some distances without releasing the emergency brakes. Such carelessness in the operation of motor vehicles results in damaged brake linings and in excessive and unnecessary strain upon the motors and the transmission mechanisms. The signalling devices which have been devised to warn operators of motor vehicles that their emergency brakes are in application are usually actuated directly or indirectly by the motors; and since devices of this character, coupled directly or indirectly to the motors, require installation by expert mechanics, such devices are usually comparatively costly. The present invention is designed to provide an emergency brake alarm which is simple and efficient in operation and which does not possess the disadvantages cited.

The primary object of the present invention is to provide an emergency brake alarm whose actuation is effected by jolting of the motor vehicle itself, and not by the motor directly or indirectly. Another object of the present invention is to provide an emergency brake alarm which can be installed by the operator of the motor vehicle with the aid of the simplest of tools, even if he is not possessed of mechanical skill. Still another object of the present invention is to provide an emergency brake alarm of construction so simple that it can be manufactured and sold at a comparatively low price. These and other objects, which will readily occur to those skilled in the art, are realized in the device illustrated in the accompanying drawing wherein Fig. 1 is a side elevation of the emergency brake alarm installed in a motor vehicle, showing the locus of the installation;

Fig. 2 is a sectional view of the emergency brake alarm taken along line 2, 2 of Fig. 1;

Fig. 3 is a side elevation in detail of the emergency brake alarm showing the arrangement of members when the emergency brake is not in application;

Fig. 4 is a sectional view of the emergency brake alarm taken along line 4, 4 of Fig. 2 showing the arrangement of members when the emergency brake is in application; and Fig. 5 is a plan view of a modified construction of one of the members of the emergency brake alarm.

As shown by these illustrations, the present invention comprises broadly a resonant member, a pendulum impacting member therefor, means for maintaining the pendulum impacting member normally arrested, and means actuated by the emergency brake when applied for releasing the pendulum impacting member from arrest, thus permitting the pendulum impacting member to oscillate freely: the specific embodiment of the present invention may be described as follows:

The casing 1, of substantial construction, is provided with apertures which serve as bearings for the rotatable arresting member 2 and the rotatable releasing member 3, and with an arcuate slot 4 through which the lug or arm 5 of the releasing member projects, and within the confines of which the lug or arm 5 may move. Within the casing 1 is mounted invertedly the bell 6, and from the ceiling of the casing 1 is suspended the disk-bob pendulum 7. The rotatable arresting member 2 is provided with an elliptical aperture 8 to receive loosely the shaft of the pendulum 7. The rotatable arresting member is also provided with a radially extending tongue 9, and with a short arm 10 which is connected to the rear wall of the casing by the spring 11. The releasing member 3 is so positioned that the outer bearing surface of its arm may contact the radially extending tongue of the arresting member 2 at a point near the axis of rotation of the arresting member, and is connected to the front wall of the casing by the spring 12. The base plate of the emergency brake alarm is provided with the apertures 13 to receive screws for attachment of the emergency brake alarm to the floor of the motor vehicle.

The operation of the emergency brake alarm is extremely simple: when the emergency brake is not in application, as is shown in Fig. 3, the disk-bob pendulum is maintained substantially motionless with respect to the bell by the arresting member which is held in position by the tension exerted by the spring 11; and no ordinary amount of jolting of the motor vehicle will cause the bell to sound; when now the emergency brake is applied, the shaft of the emergency brake contacts the lug or arm 5 of the releasing member 3, the arm of the releasing member 3 contacts the radially extending tongue 9 of the arresting member 2 near the axis of rotation of the arresting member, and then, with slight additional application of the emergency brake, lifts the arresting member 2 into the position shown in Fig. 4; thereafter, with further application of the emergency brake, the outer bearing surface of the arm of the releasing member 3 slides under and along the radially extending tongue 9 without changing appreciably the position of the arresting member 2; with the arresting member 2 in the position shown in Fig. 4, the pendulum is completely released to oscillate freely; and it responds to any jolting of the motor vehicle by impacting the bell, thereby warning the operator of the motor vehicle that the emergency brake is in application.

In Fig. 5, the arresting member is slightly modified by the provision of opposed channels 14 on opposite faces to engagingly receive the shaft of the pendulum. This modification is of particular value in the use of the present emergency brake alarm in motor vehicles of light weight wherein jolting may be great, since such construction insures positive arrest of the pendulum.

It is obvious that the emergency brake alarm as shown, whose use in no way interferes with the operating mechanism of the motor vehicle, possesses, by virtue of this fact, a decided advantage over emergency brake alarms coupled to the operating mechanisms of motor vehicles. It is likewise obvious that the emergency brake alarm as shown is adapted for use on all motor vehicles having rotatable emergency brake shafts—that is to say, it is adapted for use on all present day motor vehicles.

The presented embodiment of the present invention may be modified in many respects without departing from the scope and spirit of the invention, and the invention is to be understood as broadly novel as is commensurate with the appended claims.

Having thus described my invention, I claim:

1. An emergency brake alarm for motor vehicles comprising a resonant member, a pendulum impacting member therefor, arresting means for maintaining the pendulum impacting member normally arrested, and releasing means actuated by the emergency brake in application for effecting the release of the pendulum impacting member.

2. An emergency brake alarm for motor vehicles comprising a resonant member, a pendulum impacting member therefor, mechanically operating arresting means for maintaining the pendulum impacting member normally arrested, and releasing means actuated by the emergency brake in application for effecting the release of the pendulum impacting member.

3. An emergency brake alarm for motor vehicles comprising a resonant member, a pendulum impacting member therefor, arresting means for maintaining the pendulum impacting member normally arrested, and mechanically operating releasing means actuated by the emergency brake in application for effecting the release of the pendulum impacting member.

4. An emergency brake alarm for motor vehicles comprising a resonant member, a pendulum impacting member therefor, a rotatably mounted arresting member encircling the pendulum impacting member, spring means for maintaining the pendulum impacting member normally arrested by the arresting member, and releasing means actuated by the emergency brake in application for effecting the rotation of the arresting member to release the pendulum impacting member.

5. An emergency brake alarm for motor vehicles comprising a resonant member, a pendulum impacting member therefor, a rotatably mounted arresting member encircling the pendulum impacting member and provided with opposed channels to engagingly receive the shaft of the pendulum impacting member, spring means for maintaining the pendulum impacting member normally arrested by the arresting member, and releasing means actuated by the emergency brake in application for effecting the rotation of the arresting member to release the pendulum impacting member.

6. An emergency brake alarm for motor vehicles comprising a resonant member, a pendulum impacting member therefor, mechanically operating arresting means for maintaining the pendulum impacting member normally arrested, and a rotatably mounted releasing member actuated by the emergency brake in application to coact with the arresting means to effect the release of the pendulum impacting member.

7. An emergency brake alarm for motor vehicles comprising a resonant member, a pendulum impacting member therefor, arresting means for maintaining the pendulum impacting member normally arrested, and a rotatably mounted releasing member actuated by the emergency brake in application to coact with the arresting means to effect the complete release of the pendulum impacting member by slight rotation of the releasing member.

8. An emergency brake alarm for motor vehicles comprising a resonant member, a pendulum impacting member therefor, a rotatably mounted arresting member encircling the pendulum impacting member and provided with a radially extending tongue, spring means for maintaining the pendulum impacting member normally arrested by the arresting member, and a rotatably mounted releasing member actuated by the emergency brake in application to contact the radially extending tongue of the arresting member, and thereby, through rotation of the releasing member, to rotate the arresting member to effect the release of the pendulum impacting member.

9. An emergency brake alarm for motor vehicles comprising a resonant member, a pendulum impacting member therefor, a rotatably mounted arresting member encircling the pendulum impacting member and provided with a radially extending tongue, spring means for maintaining the pendulum impacting member normally arrested by the arresting member, and a rotatably mounted releasing member actuated by the emergency brake in application to contact the radially extending tongue of the arresting member near the axis of rotation of the arresting member, and thereby, through slight rotation of the releasing member, to rotate measurably the arresting member to effect the complete release of the pendulum impacting member.

10. An emergency brake alarm for motor vehicles comprising a casing provided with apertures to serve as bearings for an arresting member and a releasing member and with an arcuate slot, a bell mounted invertedly within the casing, a pendulum suspended within the casing to impact the bell, an arresting member mounted rotatably in its bearing apertures and provided with a radially extending tongue and with an aperture to receive loosely the shaft of the pendulum, spring means for maintaining the pendulum normally arrested by the arresting member, a releasing member mounted rotatably in its bearing apertures and provided with a lug emergent through the arcuate slot contacting the shaft of the emergency brake in application to contact the radially extending tongue of the arresting member and thereby, through rotation of the releasing member, to rotate the arresting member to effect the release of the pendulum, and spring means for maintaining the releasing member out of contact with the arresting member when the emergency brake is completely released.

11. An emergency brake alarm for motor vehicles comprising a casing provided with apertures to serve as bearings for a rotatably mounted arresting member and a rotatably mounted releasing member and with an arcuate slot, a bell mounted invertedly within the casing, a disk-bob pendulum suspended within and from the casing to impact the interior of the bell, an arresting member mounted rotatably in its bearing apertures and provided with a radially extending tongue and with an elliptical aperture to receive loosely the shaft of the disk-bob pendulum, spring means for maintaining the disk-bob pendulum normally arrested by the arresting member, a releasing member mounted rotatably in its bearing apertures and provided with a lug emergent through the arcuate slot contacting the shaft of the emergency brake in application to contact the radially extending tongue of the arresting member near the axis of rotation of the arresting member, and thereby, through slight rotation of the releasing member, to rotate measurably the arresting member to effect the complete release of the disk-bob pendulum, and spring means for maintaining the releasing member out of contact with the arresting member when the emergency brake is completely released.

WILLIAM M. KONIKOV.